United States Patent
Rix

(10) Patent No.: US 6,651,170 B1
(45) Date of Patent: Nov. 18, 2003

(54) INTEGRATED CIRCUIT AND SMART CARD COMPRISING SUCH A CIRCUIT

(75) Inventor: Simon Paul Ashley Rix, Transvaal (ZA)

(73) Assignee: Irdeto B.V., Hoofddorp (NL)

( * ) Notice: Subject to any disclaimer, the term of this patent is extended or adjusted under 35 U.S.C. 154(b) by 0 days.

(21) Appl. No.: 09/224,904

(22) Filed: Jan. 4, 1999

(30) Foreign Application Priority Data

Jan. 14, 1998 (EP) .............................................. 98200082

(51) Int. Cl.[7] ................................................. H04L 9/00
(52) U.S. Cl. ........................ 713/193; 380/44; 380/286
(58) Field of Search ................................ 380/264, 286, 380/44; 705/66, 41; 713/172, 193, 200

(56) References Cited

U.S. PATENT DOCUMENTS

| | | | |
|---|---|---|---|
| 5,150,407 A | | 9/1992 | Chan .............................. 380/4 |
| 5,623,637 A | * | 4/1997 | Jones et al. .................. 395/491 |
| 5,778,068 A | * | 7/1998 | Johnson et al. ................ 380/25 |
| 5,809,140 A | * | 9/1998 | Rubin et al. ................... 380/21 |
| 5,878,142 A | * | 3/1999 | Caputo et al. ................. 380/25 |
| 5,953,422 A | * | 9/1999 | Angelo et al. ................. 380/23 |
| 5,956,403 A | * | 9/1999 | Lipner et al. .................. 380/21 |
| 6,308,268 B1 | * | 10/2001 | Audebert ...................... 713/182 |

FOREIGN PATENT DOCUMENTS

| | | |
|---|---|---|
| EP | 0 281 059 A | 9/1988 |
| EP | 0 434 550 A | 6/1991 |
| EP | 0 434 551 A | 6/1991 |

\* cited by examiner

Primary Examiner—Gilberto Barron
Assistant Examiner—Paul Callahan
(74) Attorney, Agent, or Firm—Blakely, Sokoloff, Taylor & Zafman LLP

(57) ABSTRACT

An integrated circuit comprises a first processing unit and a non-volatile memory for storing a key. The first processing unit is arranged to carry out a cryptographic algorithm using the stored key. The non-volatile memory comprises at least two non-volatile memory elements, each memory element storing a share of a key used in the cryptographic algorithm. Each memory element is connected to the first processing unit by an independent bus.

3 Claims, 2 Drawing Sheets

001
INTEGRATED CIRCUIT AND SMART CARD COMPRISING SUCH A CIRCUIT

BACKGROUND OF THE INVENTION

The invention relates to an integrated circuit comprising a first processing unit and a non-volatile memory for storing a key, said first processing unit being arranged to carry out a cryptographic algorithm using said stored key, and to a smart card comprising such a circuit.

Such integrated circuits are used in various systems secured against penetration/use by unauthorized persons. The stored key is used to obtain the clear text of encrypted messages using the cryptographic algorithm. As an example of a system in which such an integrated circuit could be used a pay-TV system can be mentioned.

In view of the availability of more and more improved technical equipment to examine integrated circuits and their operation, unauthorized persons have the possibility to read a stored key from an integrated circuit of this type, whereby security of the system is broken.

The invention aims to provide an integrated circuit of the above-mentioned type with improved security.

SUMMARY OF THE INVENTION

According to the invention an integrated circuit is provided, the integrated circuit comprising a first processing unit and a non-volatile memory for storing a key, said first processing unit being arranged to carry out a cryptographic algorithm using said stored key, wherein the non-volatile memory comprises at least two non-volatile memory elements, each memory element storing a share of a key used in the cryptographic algorithm, wherein each memory element is connected to the first processing unit by an independent bus.

In this manner an integrated circuit with increased complexity is obtained, wherein both busses and/or logic circuits-within the processing unit have to be probed in order to recover the complete key.

According to the invention complexity can be further increased in a circuit, wherein second and third processing units are provided, the second processing unit being connected to each memory element by the corresponding independent bus, wherein each memory element stores a key share for the first and second processing units, said first and second processing units using each said key shares to determine an output key share, wherein the outputs of the first and second processing units are connected to the third processing unit to provide said output key shares to the third processing unit which is arranged to carry out the cryptographic algorithm.

The invention will be further explained by reference to the drawings in which two embodiments are shown in a very schematical way.

DETAILED DESCRIPTION OF THE INVENTION

Figure 1:
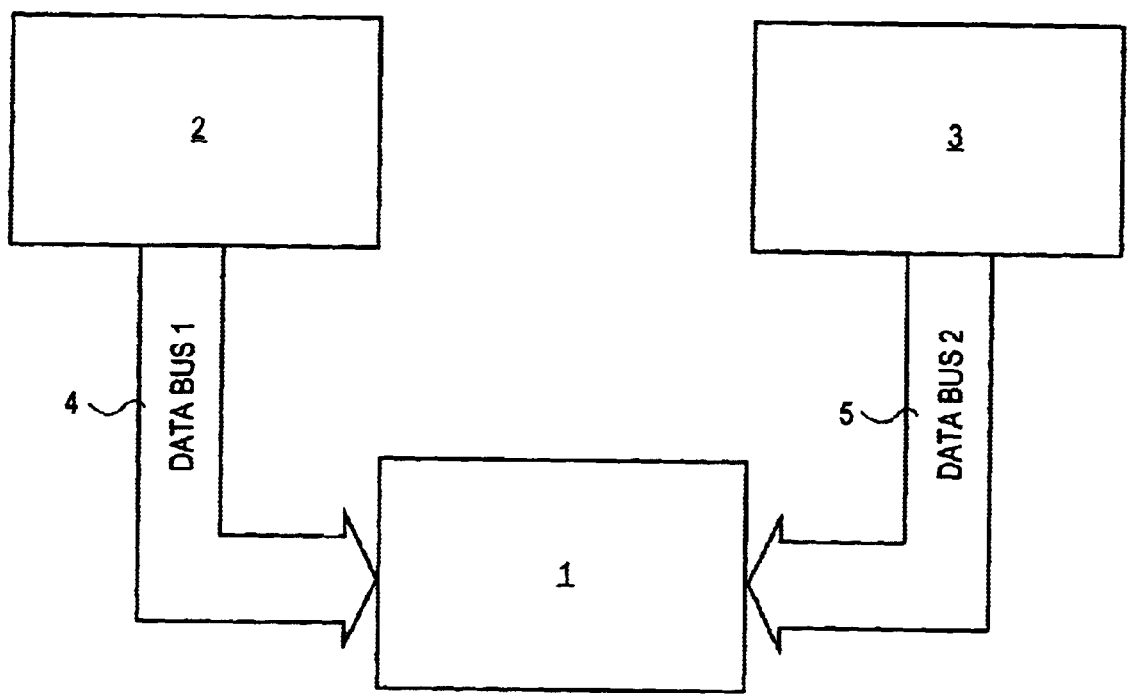
FIG. 1 shows a simplified circuit diagram of a first embodiment of the integrated circuit according to the invention.

FIG. 1 shows in a simplified manner a circuit diagram of an integrated circuit comprising a processing unit 1, a first non-volatile memory element 2 and a second non-volatile memory element 3. The memory elements 2, 3 each are connected to the processing unit 1 through an independent data bus 4, 5, respectively.

The processing unit is arranged to carry out a cryptographic algorithm wherein an encrypted message or the like is decrypted by means of a key. In the integrated circuit described, memory element 2 stores a first share of the key and memory element 3 stores a second share of the key, so that the complete key is not available on any of the data busses 4, 5. The key shares are combined within the processing unit 1 and used in the cryptographic algorithm to decrypt encrypted messages received through an input bus not shown.

By means of the described storing of the key in the form of two separate key shares, one share in each memory 2 or 3, the complexity of the integrated circuit is increased and thereby access to the key for unauthorized persons is made more difficult if not impossible.

Figure 2:
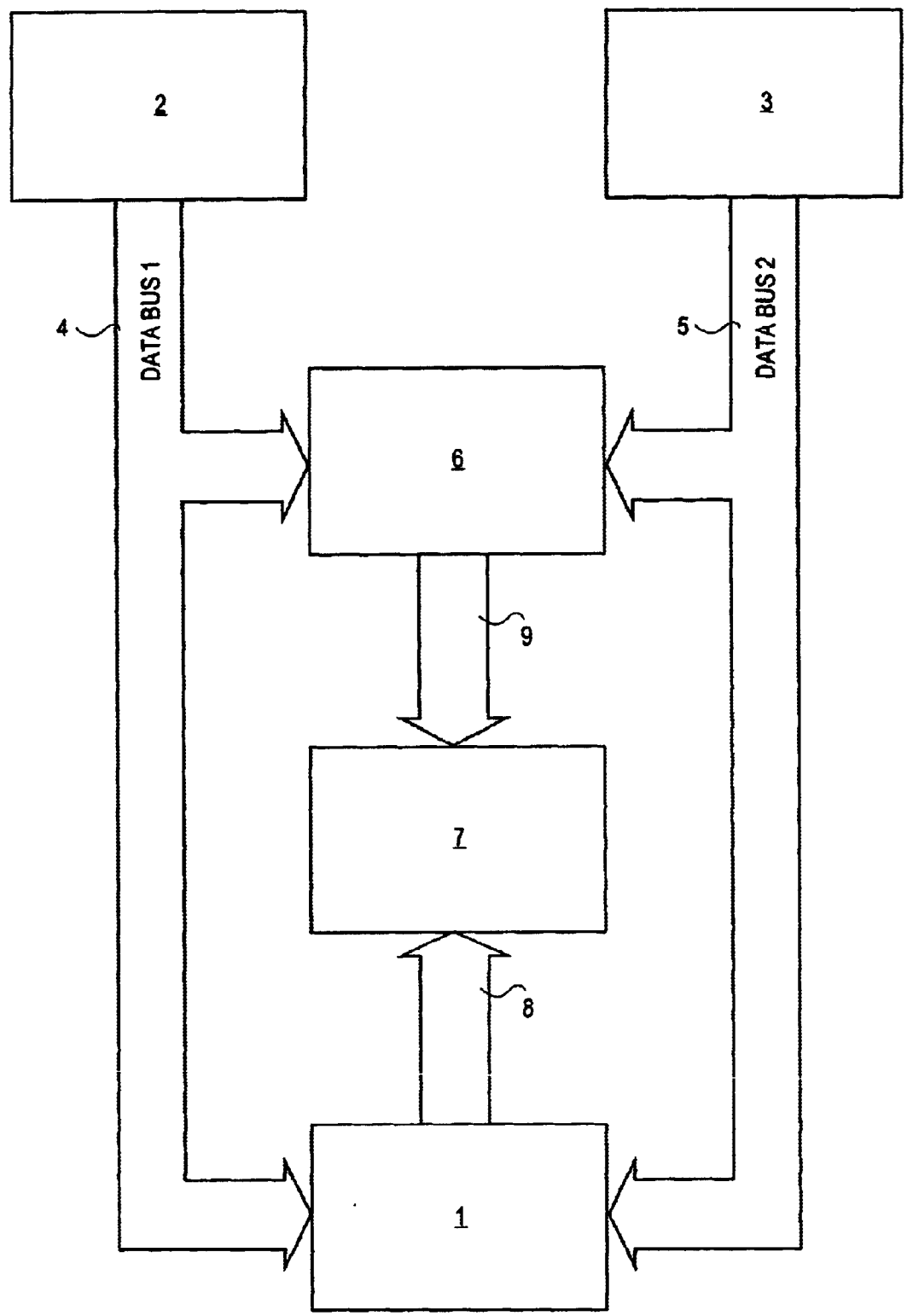
FIG. 2 shows a simplified diagram of a second embodiment of the integrated circuit according to the invention.

FIG. 2 shows a further embodiment of the integrated circuit of the invention, wherein complexity of the integrated circuit is further increased by adding a second processing unit 6 and a third processing unit 7. As in the embodiment of FIG. 1, two non-volatile memory elements 2 and 3 are provided and two independent data busses 4 and 5 connecting the memory elements 2, 3 to the processing unit 1 and the second processing unit 6. Each memory element 2 and 3 stores two key shares, one for each of the first and second processing units 1 and 6. Each of the first and second processing units 1 and 6 combines the key shares received from the memory elements 2, 3 into an output key share provided to the third processing unit as indicated by the connections 8 and 9, respectively. The third processing unit 7 combines the two output key shares received from the first and second processing units 1, 6 into a key which is used in a cryptographic algorithm carried out by this third processing unit. It will be clear that the complexity of this integrated circuit of FIG. 2 is such that the key needed to carry out the cryptographic algorithm cannot be probed.

It is noted that the first, second and third processing units 1, 6 and 7 can be made as one logic circuitry.

It is further noted that combining key shares to obtain the key or output key share (in case of the embodiment of FIG. 2) can be any combination, such as an XOR operation or the like.

Although in the above embodiments two memory elements are used for storing two key shares, it is also possible to have more than two memory elements with independent data busses for storing more than two key shares to be combined to obtain the real key for the cryptographic proces.

Integrated circuits according to the invention can be used advantageously in smart cards for a pay-TV system with enhanced security against penetration by pirates.

The invention is not restricted to the above-described embodiments which can be varied in a number of ways within the scope of the claims.

What is claimed is:

1. An integrated circuit comprising a first processing unit and a non-volatile memory for storing a key, said first processing unit being arranged to carry out a cryptographic algorithm using said stored key, wherein said non-volatile memory comprises at least two non-volatile memory elements, each memory element storing a share of a key used in the cryptographic algorithm, wherein each memory element is connected to the first processing unit by an independent bus.

2. A method for carrying out a cryptographic algorithm using a key, wherein first and second shares of the key are stored in non-volatile memory elements, the first and second key shares are provided to a first processing unit through independent busses and the key shares are combined in said processing unit to carry out the cryptographic algorithm.

3. A smart card comprising an integrated circuit according to claim 1.

* * * * *